United States Patent [19]
Touboul

[11] Patent Number: 6,092,194
[45] Date of Patent: *Jul. 18, 2000

[54] SYSTEM AND METHOD FOR PROTECTING A COMPUTER AND A NETWORK FROM HOSTILE DOWNLOADABLES

[75] Inventor: Shlomo Touboul, Kefar-Haim, Israel

[73] Assignee: Finjan Software, Ltd., Netanya, Israel

[ * ] Notice: This patent issued on a continued prosecution application filed under 37 CFR 1.53(d), and is subject to the twenty year patent term provisions of 35 U.S.C. 154(a)(2).

[21] Appl. No.: 08/964,388

[22] Filed: Nov. 6, 1997

Related U.S. Application Data

[60] Provisional application No. 60/030,639, Nov. 8, 1996.

[51] Int. Cl.[7] .................................................. H04L 1/00
[52] U.S. Cl. ............................................................ 713/200
[58] Field of Search ............................... 395/187.01, 186; 713/200, 201, 202; 714/38, 704; 709/229

[56] References Cited

U.S. PATENT DOCUMENTS

| | | | |
|---|---|---|---|
| 5,077,677 | 12/1991 | Murphy et al. | 395/10 |
| 5,361,359 | 11/1994 | Tajalli et al. | 395/700 |
| 5,485,409 | 1/1996 | Gupta et al. | 395/186 |
| 5,485,575 | 1/1996 | Chess et al. | 395/183.14 |
| 5,572,643 | 11/1996 | Judson | 395/793 |
| 5,623,600 | 4/1997 | Ji et al. | 395/187.01 |
| 5,638,446 | 6/1997 | Rubin | 380/25 |
| 5,692,047 | 11/1997 | McManis | 380/4 |
| 5,692,124 | 11/1997 | Holden et al. | 395/187.01 |
| 5,720,033 | 2/1998 | Deo | 395/186 |
| 5,724,425 | 3/1998 | Chang et al. | 380/25 |
| 5,740,248 | 4/1998 | Fieres et al. | 380/25 |
| 5,761,421 | 6/1998 | van Hoff et al. | 395/200.53 |
| 5,765,205 | 6/1998 | Breslau et al. | 711/203 |
| 5,784,459 | 7/1998 | Devarakonda et al. | 380/4 |
| 5,796,952 | 8/1998 | Davis et al. | 395/200.54 |
| 5,805,829 | 9/1998 | Cohen et al. | 395/200.32 |
| 5,832,208 | 11/1998 | Chen et al. | 395/187.01 |
| 5,850,559 | 12/1998 | Angelo et al. | 395/750.03 |
| 5,864,683 | 1/1999 | Boebert et al. | 395/200.79 |
| 5,892,904 | 4/1999 | Atkinson et al. | 395/187.01 |

OTHER PUBLICATIONS

Web page: http://iel.ihs.com:80/cgi–bin/iel__cgi?se...2ehts%26ViewTemplate%3ddocvie%5fb%2ehts, Okamato, E. et al., "ID–Based Authentication System For Computer Virus Detection", IEEE/IEE Electronic Library online, Electronics Letters, vol. 26, Issue 15, ISSN 0013–5194, Jul. 19, 1990, Abstract and pp. 1169–1170.

(List continued on next page.)

*Primary Examiner*—Robert W. Beausoliel, Jr.
*Assistant Examiner*—Christopher Revak
*Attorney, Agent, or Firm*—Graham & James LLP

[57] ABSTRACT

A system protects a computer from suspicious Downloadables. The system comprises a security policy, an interface for receiving a Downloadable, and a comparator, coupled to the interface, for applying the security policy to the Downloadable to determine if the security policy has been violated. The Downloadable may include a Java™ applet, an ActiveX™ control, a JavaScript™ script, or a Visual Basic script. The security policy may include a default security policy to be applied regardless of the client to whom the Downloadable is addressed, or a specific security policy to be applied based on the client or the group to which the client belongs. The system uses an ID generator to compute a Downloadable ID identifying the Downloadable, preferably, by fetching all components of the Downloadable and performing a hashing function on the Downloadable including the fetched components. Further, the security policy may indicate several tests to perform, including (1) a comparison with known hostile and non-hostile Downloadables; (2) a comparison with Downloadables to be blocked or allowed per administrative override; (3) a comparison of the Downloadable security profile data against access control lists; (4) a comparison of a certificate embodied in the Downloadable against trusted certificates; and (5) a comparison of the URL from which the Downloadable originated against trusted and untrusted URLs. Based on these tests, a logical engine can determine whether to allow or block the Downloadable.

68 Claims, 10 Drawing Sheets

OTHER PUBLICATIONS

"Finjan Announces a Personal Java ™ Firewall For Web Browsers—the SurfinShield™ 1.6", Press Release of Finjan Releases SurfinShield, Oct. 21, 1996, 2 pages.

"Finjan Software Releases SurfinBoard, Industry's First JAVA Security Product For the World Wide Web", Article published on the Internet by Finjan Software, Ltd., Jul. 29, 1996, 1 page.

"Powerful PC Security for the New World of Java™ and Downloadables, Surfin Shield™"Article published on the Internet by Finjan Software Ltd., 1996, 2 Pages.

"Company Profile Finjan—Safe Surfing, The Java Security Solutions Provider" Article published on the Internet by Finjan Software Ltd., Oct. 31, 1996, 3 pages.

"Finjan Announces Major Power Boost and New Features for SurfinShield™ 2.0" Las Vegas Convention Center/Pavillion 5 P5551, Nov. 18, 1996, 3 pages.

"Java Security: Issues & Solutions" Article published on the Internet by Finjan Software Ltd., 1996, 8 pages.

"Products" Article published on the Internet, 7 pages.

Mark LaDue, "Online Business Consultant" Article published on the Internet, Home Page, Inc. 1996, 4 pages.

Jim K. Omura, "Novel Applications of Cryptography in Digital Communications", IEEE Communications Magazine, p 27, May 1990.

Norvin Leach et al, "IE 3.0 applets will earn certification", PC Week, v13, n29, p1(2), Jul. 1996.

Microsoft Authenticode Technology, "Ensuring Accountability and Authenticity for Software Components on the Internet", Microsoft Corporation, Oct. 1996.

Frequently Asked Questions About Authenticode, Microsoft Corporation, Feb. 1997.

SYSTEM AND METHOD FOR PROTECTING A COMPUTER AND A NETWORK FROM HOSTILE DOWNLOADABLES

INCORPORATION BY REFERENCE TO RELATED APPLICATION

This application hereby incorporates by reference related U.S. patent application Ser. No. 08/790,097, entitled "System and Method for Protecting a Client from Hostile Downloadables," filed on Jan. 29, 1997, by inventor Shlomo Touboul.

PRIORITY REFERENCE TO PROVISIONAL APPLICATION

This application claims benefit of and hereby incorporates by reference provisional application Ser. No. 60/030,639, entitled "System and Method for Protecting a Computer from Hostile Downloadables," filed on Nov. 8, 1996, by inventor Shlomo Touboul.

BACKGROUND OF THE INVENTION

1. Field of the Invention

This invention relates generally to computer networks, and more particularly provides a system and method for protecting a computer and a network from hostile Downloadables.

2. Description of the Background Art

The Internet is currently a collection of over 100,000 individual computer networks owned by governments, universities, nonprofit groups and companies, and is expanding at an accelerating rate. Because the Internet is public, the Internet has become a major source of many system damaging and system fatal application programs, commonly referred to as "viruses."

Accordingly, programmers continue to design computer and computer network security systems for blocking these viruses from attacking both individual and network computers. On the most part, these security systems have been relatively successful. However, these security systems are not configured to recognize computer viruses which have been attached to or configured as Downloadable application programs, commonly referred to as "Downloadables." A Downloadable is an executable application program, which is downloaded from a source computer and run on the destination computer. Downloadable is typically requested by an ongoing process such as by an Internet browser or web engine. Examples of Downloadables include Java™ applets designed for use in the Java™ distributing environment developed by Sun Microsystems, Inc., JavaScript scripts also developed by Sun Microsystems, Inc., ActiveX™ controls designed for use in the ActiveX™ distributing environment developed by the Microsoft Corporation, and Visual Basic also developed by the Microsoft Corporation. Therefore, a system and method are needed to protect a network from hostile Downloadables.

SUMMARY OF THE INVENTION

The present invention provides a system for protecting a network from suspicious Downloadables. The system comprises a security policy, an interface for receiving a Downloadable, and a comparator, coupled to the interface, for applying the security policy to the Downloadable to determine if the security policy has been violated. The Downloadable may include a Java™ applet, an ActiveX™ control, a JavaScript™ script, or a Visual Basic script. The security policy may include a default security policy to be applied regardless of the client to whom the Downloadable is addressed, a specific security policy to be applied based on the client or the group to which the client belongs, or a specific policy to be applied based on the client/group and on the particular Downloadable received. The system uses an ID generator to compute a Downloadable ID identifying the Downloadable, preferably, by fetching all components of the Downloadable and performing a hashing function on the Downloadable including the fetched components.

Further, the security policy may indicate several tests to perform, including (1) a comparison with known hostile and non-hostile Downloadables; (2) a comparison with Downloadables to be blocked or allowed per administrative override; (3) a comparison of the Downloadable security profile data against access control lists; (4) a comparison of a certificate embodied in the Downloadable against trusted certificates; and (5) a comparison of the URL from which the Downloadable originated against trusted and untrusted URLs. Based on these tests, a logical engine can determine whether to allow or block the Downloadable.

The present invention further provides a method for protecting a computer from suspicious Downloadables. The method comprises the steps of receiving a Downloadable, comparing the Downloadable against a security policy to determine if the security policy has been violated, and discarding the Downloadable if the security policy has been violated.

It will be appreciated that the system and method of the present invention may provide computer protection from known hostile Downloadables. The system and method of the present invention may identify Downloadables that perform operations deemed suspicious. The system and method of the present invention may examine the Downloadable code to determine whether the code contains any suspicious operations, and thus may allow or block the Downloadable accordingly.

DETAILED DESCRIPTION OF THE PREFERRED EMBODIMENT

Figure 1:
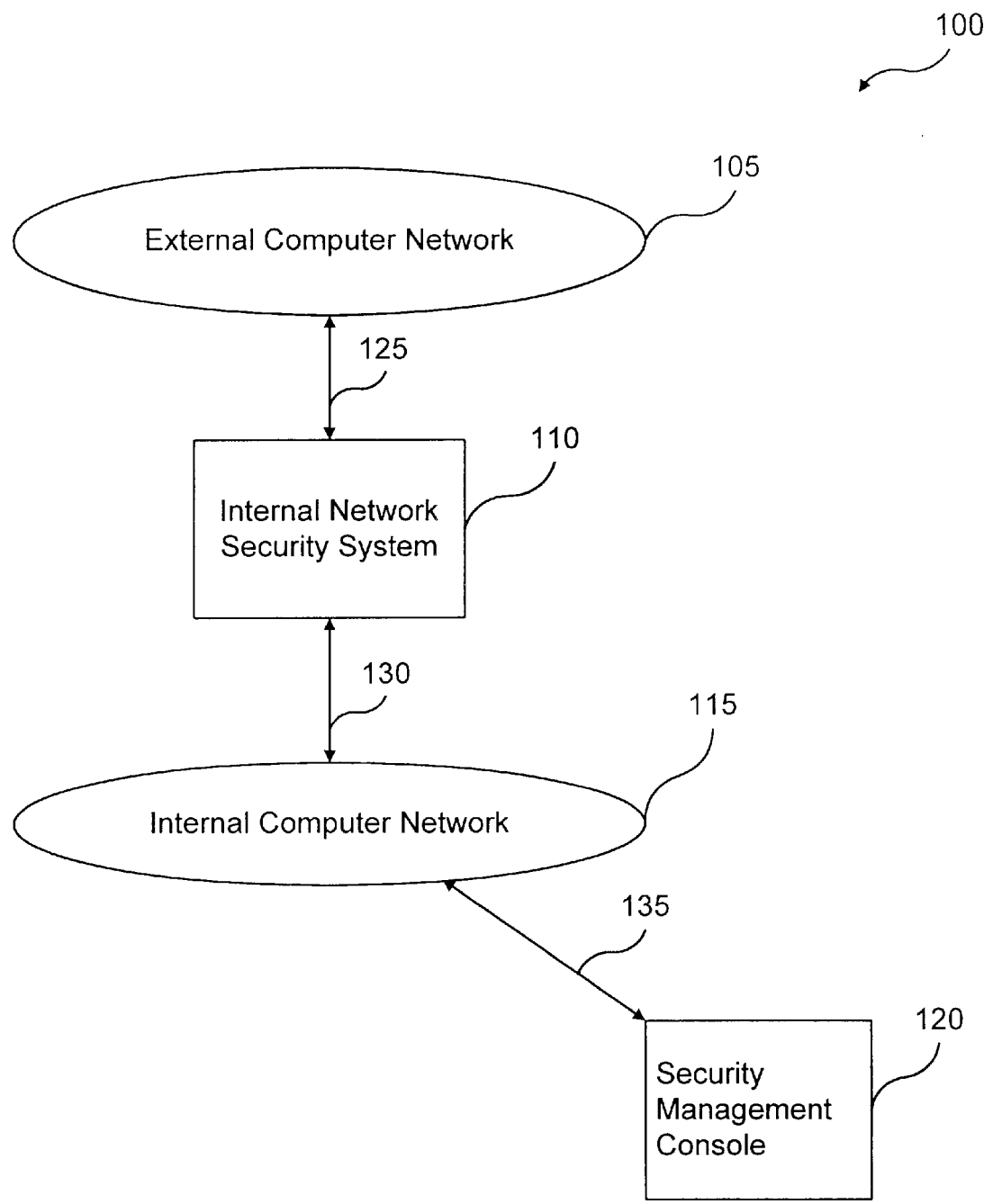
FIG. 1 is a block diagram illustrating a network system, in accordance with the present invention.

FIG. 1 is a block diagram illustrating a network system 100, in accordance with the present invention. The network system 100 includes an external computer network 105, such as the Wide Area Network (WAN) commonly referred to as the Internet, coupled via a communications channel 125 to an internal network security system 110. The network system 100 further includes an internal computer network 115, such as a corporate Local Area Network (LAN), coupled via a communications channel 130 to the internal network computer system 110 and coupled via a communications channel 135 to a security management console 120.

The internal network security system 110 examines Downloadables received from external computer network 105, and prevents Downloadables deemed suspicious from reaching the internal computer network 115. It will be further appreciated that a Downloadable is deemed suspicious if it performs or may perform any undesirable operation, or if it threatens or may threaten the integrity of an internal computer network 115 component. It is to be understood that the term "suspicious" includes hostile, potentially hostile, undesirable, potentially undesirable, etc. Security management console 120 enables viewing, modification and configuration of the internal network security system 110.

Figure 2:
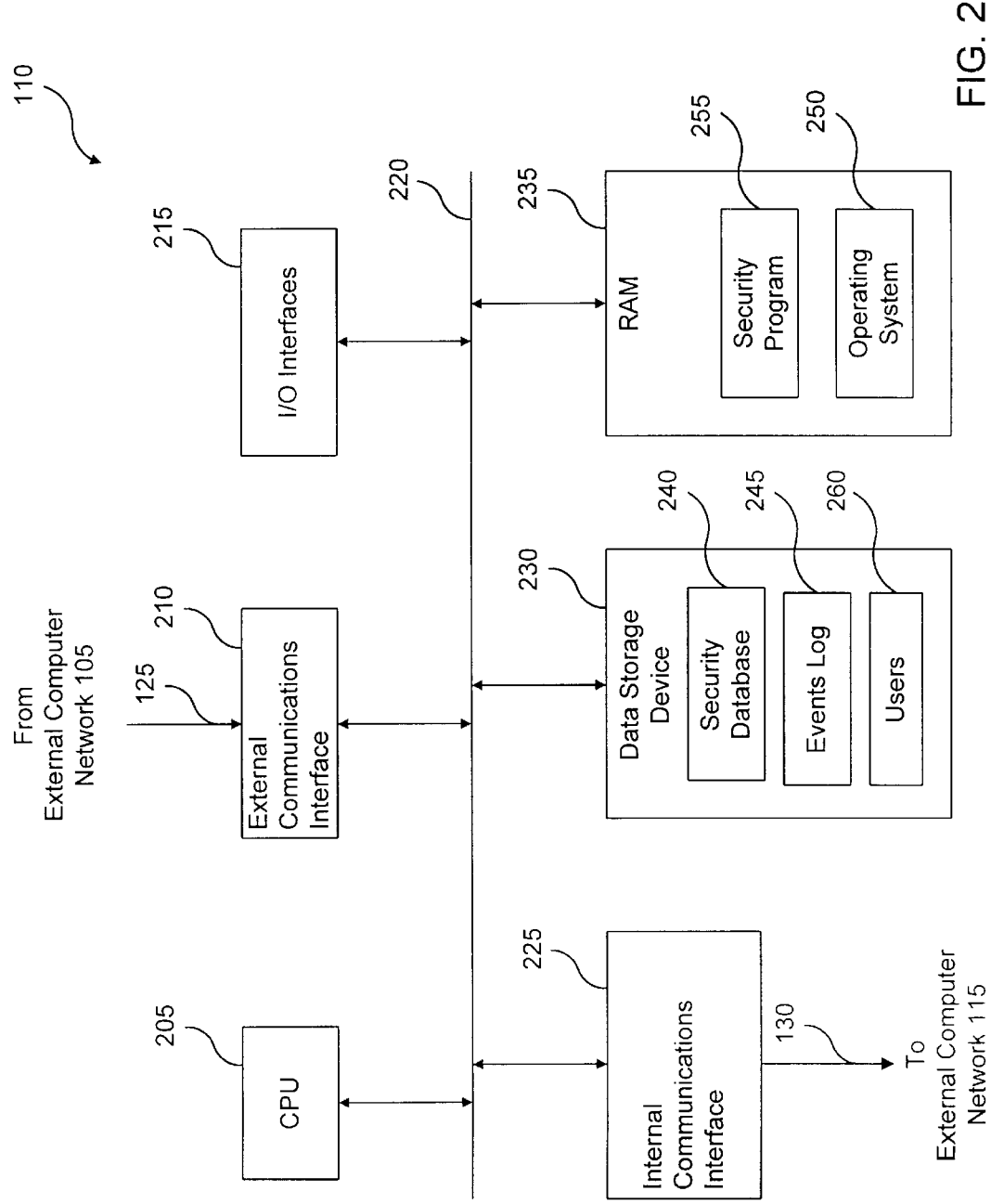
FIG. 2 is a block diagram illustrating details of the internal network security system of FIG. 1.

FIG. 2 is a block diagram illustrating details of the internal network security system 110, which includes a Central Processing Unit (CPU) 205, such as an Intel Pentium® microprocessor or a Motorola Power PC® microprocessor, coupled to a signal bus 220. The internal network security system 110 further includes an external communications interface 210 coupled between the communications channel 125 and the signal bus 220 for receiving Downloadables from external computer network 105, and an internal communications interface 225 coupled between the signal bus 220 and the communications channel 130 for forwarding Downloadables not deemed suspicious to the internal computer network 115. The external communications interface 210 and the internal communications interface 225 may be functional components of an integral communications interface (not shown) for both receiving Downloadables from the external computer network 105 and forwarding Downloadables to the internal computer network 115.

Internal network security system 110 further includes Input/Output (I/O) interfaces 215 (such as a keyboard, mouse and Cathode Ray Tube (CRT) display), a data storage device 230 such as a magnetic disk, and a Random-Access Memory (RAM) 235, each coupled to the signal bus 220. The data storage device 230 stores a security database 240, which includes security information for determining whether a received Downloadable is to be deemed suspicious. The data storage device 230 further stores a users list 260 identifying the users within the internal computer network 115 who may receive Downloadables, and an event log 245 which includes determination results for each Downloadable examined and runtime indications of the internal network security system 110. An operating system 250 controls processing by CPU 205, and is typically stored in data storage device 230 and loaded into RAM 235 (as illustrated) for execution. A security program 255 controls examination of incoming Downloadables, and also may be stored in data storage device 230 and loaded into RAM 235 (as illustrated) for execution by CPU 205.

Figure 3:
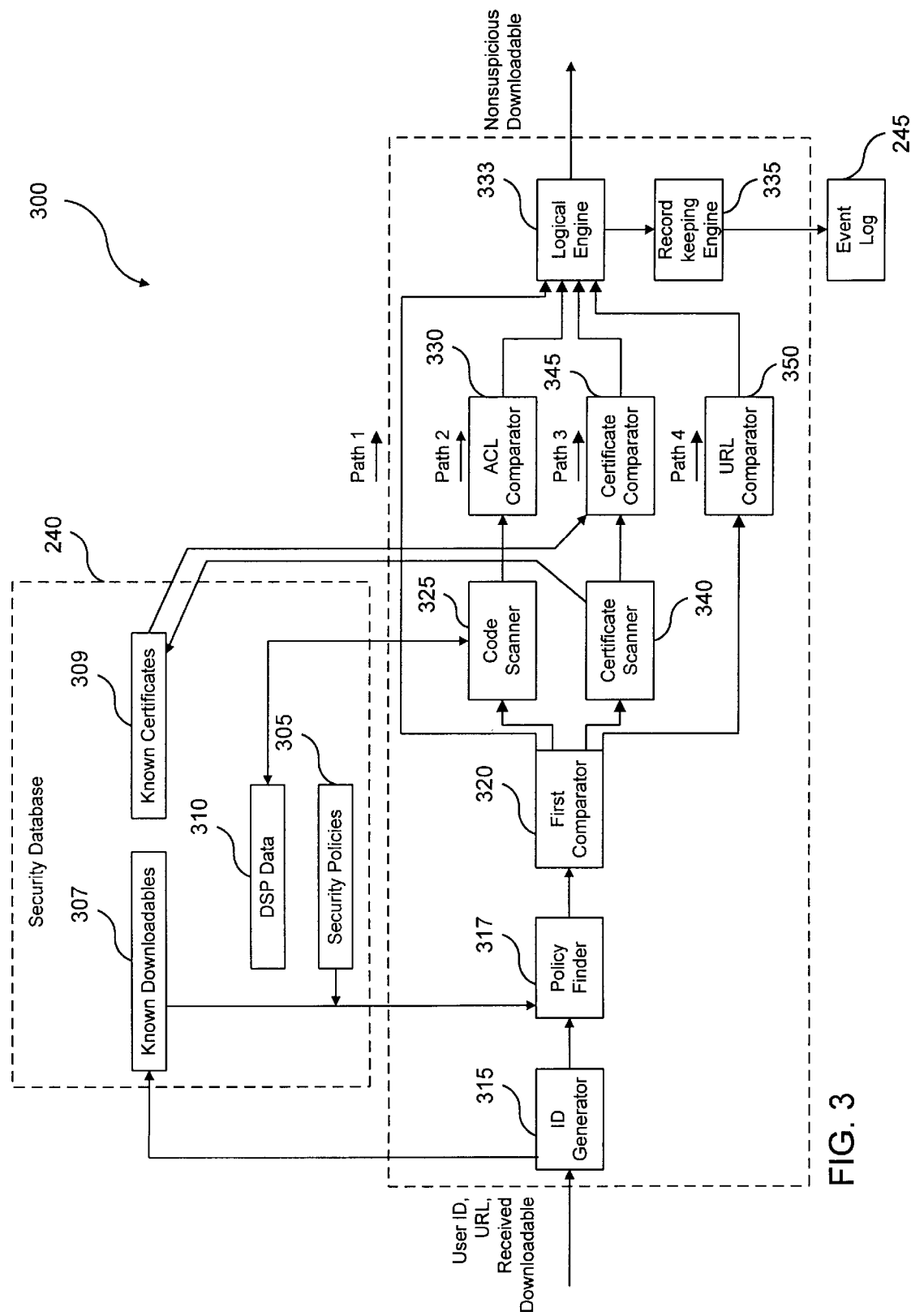
FIG. 3 is a block diagram illustrating details of the security program and the security database of FIG. 2.

FIG. 3 is a block diagram illustrating details of the security program 255 and the security database 240. The security program 255 includes an ID generator 315, a policy finder 317 coupled to the ID generator 315, and a first comparator 320 coupled to the policy finder 317. The first comparator 320 is coupled to a logical engine 333 via four separate paths, namely, via Path 1, via Path 2, via Path 3 and via Path 4. Path 1 includes a direct connection from the first comparator 320 to the logical engine 333. Path 2 includes a code scanner coupled to the first comparator 320, and an Access Control List (ACL) comparator 330 coupling the code scanner 325 to the logical engine 333. Path 3 includes a certificate scanner 340 coupled to the first comparator 320, and a certificate comparator 345 coupling the certificate scanner 340 to the logical engine 333. Path 4 includes a Uniform Resource Locator (URL) comparator 350 coupling the first comparator 320 to the logical engine 3330. A record-keeping engine 335 is coupled between the logical engine 333 and the event log 245.

Figure 4:
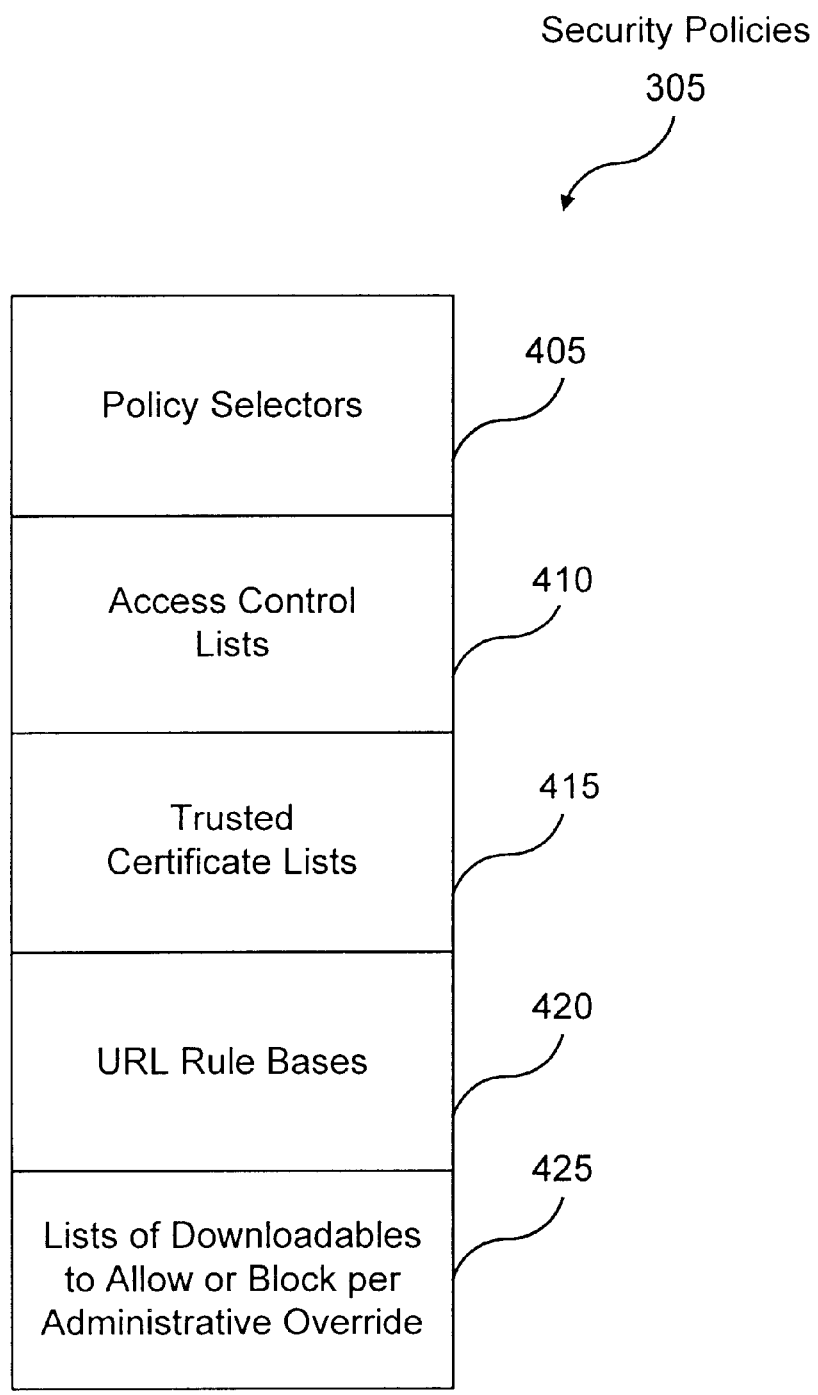
FIG. 4 is a block diagram illustrating details of the security policies of FIG. 3.

The security program 255 operates in conjunction with the security database 240, which includes security policies 305, known Downloadables 307, known Certificates 309 and Downloadable Security Profile (DSP) data 310 corresponding to the known Downloadables 307. Security policies 305 includes policies specific to particular users 260 and default (or generic) policies for determining whether to allow or block an incoming Downloadable. These security policies 305 may identify specific Downloadables to block, specific Downloadables to allow, or necessary criteria for allowing an unknown Downloadable. Referring to FIG. 4, security policies 305 include policy selectors 405, access control lists 410, trusted certificate lists 415, URL rule bases 420, and lists 425 of Downloadables to allow or to block per administrative override.

Known Downloadables 307 include lists of Downloadables which Original Equipment Manufacturers (OEMs) know to be hostile, of Downloadables which OEMs know to be non-hostile, and of Downloadables previously received by this security program 255. DSP data 310 includes the list of all potentially hostile or suspicious computer operations that may be attempted by each known Downloadable 307, and may also include the respective arguments of these operations. An identified argument of an operation is referred to as "resolved." An unidentified argument is referred to as "unresolved." DSP data 310 is described below with reference to the code scanner 325.

The ID generator 315 receives a Downloadable (including the URL from which it came and the userID of the intended recipient) from the external computer network 105 via the external communications interface 210, and generates a Downloadable ID for identifying each Downloadable. The Downloadable ID preferably includes a digital hash of the complete Downloadable code. The ID generator 315 preferably prefetches all components embodied in or identified by the code for Downloadable ID generation. For example, the ID generator 315 may prefetch all classes embodied in or identified by the Java™ applet bytecode to generate the Downloadable ID. Similarly, the ID generator 315 may retrieve all components listed in the .INF file for an ActiveX™ control to compute a Downloadable ID. Accordingly, the Downloadable ID for the Downloadable will be the same each time the ID generator 315 receives the same Downloadable. The ID generator 315 adds the generated Downloadable ID to the list of known Downloadables 307 (if it is not already listed). The ID generator 315 then forwards the Downloadable and Downloadable ID to the policy finder 317.

The policy finder 317 uses the userID of the intended user and the Downloadable ID to select the specific security policy 305 that shall be applied on the received Downloadable. If there is a specific policy 305 that was defined for the user (or for one of its super groups) and the Downloadable, then the policy is selected. Otherwise the generic policy 305 that was defined for the user (or for one of its super groups) is selected. The policy finder 317 then sends the policy to the first comparator 320.

The first comparator 320 receives the Downloadable, the Downloadable ID and the security policy 305 from the policy finder 317. The first comparator 320 examines the security policy 305 to determine which steps are needed for allowing the Downloadable. For example, the security policy 305 may indicate that, in order to allow this Downloadable, it must pass all four paths, Path 1, Path 2, Path 3 and Path 4. Alternatively, the security policy 305 may indicate that to allow the Downloadable, it must pass only one of the paths. The first comparator 320 responds by forwarding the proper information to the paths identified by the security policy 305.

Path 1

In path 1, the first comparator 320 checks the policy selector 405 of the security policy 305 that was received from the policy finder 317. If the policy selector 405 is either "Allowed" or "Blocked," then the first comparator 320 forwards this result directly to the logical engine 333. Otherwise, the first comparator 320 invokes the comparisons in path 2 and/or path 3 and/or path 4 based on the contents of policy selector 405. It will be appreciated that the first comparator 320 itself compares the Downloadable ID against the lists of Downloadables to allow or block per administrative override 425. That is, the system security administrator can define specific Downloadables as "Allowed" or "Blocked."

Alternatively, the logical engine 333 may receive the results of each of the paths and based on the policy selector 405 may institute the final determination whether to allow or block the Downloadable. The first comparator 320 informs the logical engine 333 of the results of its comparison.

Path 2

In path 2, the first comparator 320 delivers the Downloadable, the Downloadable ID and the security policy 305 to the code scanner 325. If the DSP data 310 of the received Downloadable is known, the code scanner 325 retrieves and forwards the information to the ACL comparator 330. Otherwise, the code scanner 325 resolves the DSP data 310. That is, the code scanner 325 uses conventional parsing techniques to decompose the code (including all prefetched components) of the Downloadable into the DSP data 310. DSP data 310 includes the list of all potentially hostile or suspicious computer operations that may be attempted by a specific Downloadable 307, and may also include the respective arguments of these operations. For example, DSP data 310 may include a READ from a specific file, a SEND to an unresolved host, etc. The code scanner 325 may generate the DSP data 310 as a list of all operations in the Downloadable code which could ever be deemed potentially hostile and a list of all files to be accessed by the Downloadable code. It will be appreciated that the code scanner 325 may search the code for any pattern, which is undesirable or suggests that the code was written by a hacker.

An Example List of Operations Deemed Potentially Hostile

File operations: READ a file, WRITE a file;

Network operations: LISTEN on a socket, CONNECT to a socket, SEND data, RECEIVE data, VIEW INTRANET;

Registry operations: READ a registry item, WRITE a registry item;

Operating system operations: EXIT WINDOWS, EXIT BROWSER, START PROCESS/THREAD, KILL PROCESS/THREAD, CHANGE PROCESS/THREAD PRIORITY, DYNAMICALLY LOAD A CLASS/LIBRARY, etc.; and Resource usage thresholds: memory, CPU, graphics, etc.

In the preferred embodiment, the code scanner 325 performs a full-content inspection. However, for improved speed but reduced security, the code scanner 325 may examine only a portion of the Downloadable such as the Downloadable header. The code scanner 325 then stores the DSP data into DSP data 310 (corresponding to its Downloadable ID), and sends the Downloadable, the DSP data to the ACL comparator 330 for comparison with the security policy 305.

The ACL comparator 330 receives the Downloadable, the corresponding DSP data and the security policy 305 from the code scanner 325, and compares the DSP data against the security policy 305. That is, the ACL comparator 330 compares the DSP data of the received Downloadable against the access control lists 410 in the received security policy 305. The access control list 410 contains criteria indicating whether to pass or fail the Downloadable. For example, an access control list may indicate that the Downloadable fails if the DSP data includes a WRITE command to a system file. The ACL comparator 330 sends its results to the logical engine 333.

Path 3

In path 3, the certificate scanner 340 determines whether the received Downloadable was signed by a certificate authority, such as VeriSign, Inc., and scans for a certificate embodied in the Downloadable. The certificate scanner 340 forwards the found certificate to the certificate comparator 345. The certificate comparator 345 retrieves known certificates 309 that were deemed trustworthy by the security administrator and compares the found certificate with the known certificates 309 to determine whether the Downloadable was signed by a trusted certificate. The certificate comparator 345 sends the results to the logical engine 333.

Path 4

In path 4, the URL comparator 350 examines the URL identifying the source of the Downloadable against URLs stored in the URL rule base 420 to determine whether the Downloadable comes from a trusted source. Based on the security policy 305, the URL comparator 350 may deem the Downloadable suspicious if the Downloadable comes from an untrustworthy source or if the Downloadable did not come from a trusted source. For example, if the Downloadable comes from a known hacker, then the Downloadable may be deemed suspicious and presumed hostile. The URL comparator 350 sends its results to the logical engine 333.

The logical engine 333 examines the results of each of the paths and the policy selector 405 in the security policy 305 to determine whether to allow or block the Downloadable. The policy selector 405 includes a logical expression of the results received from each of the paths. For example, the logical engine 333 may block a Downloadable if it fails any one of the paths, i.e., if the Downloadable is known hostile (Path 1), if the Downloadable may request suspicious operations (Path 2), if the Downloadable was not signed by a trusted certificate authority (Path 3), or if the Downloadable came from an untrustworthy source (Path 4). The logical engine 333 may apply other logical expressions according to the policy selector 405 embodied in the security policy 305. If the policy selector 405 indicates that the Downloadable may pass, then the logical engine 333 passes the Downloadable to its intended recipient. Otherwise, if the policy selector 405 indicates that the Downloadable should be blocked, then the logical engine 333 forwards a non-hostile Downloadable to the intended recipient to inform the user that internal network security system 110 discarded the original Downloadable. Further, the logical engine 333 forwards a status report to the record-keeping engine 335, which stores the reports in event log 245 in the data storage device 230 for subsequent review, for example, by the MIS director.

Figure 5:
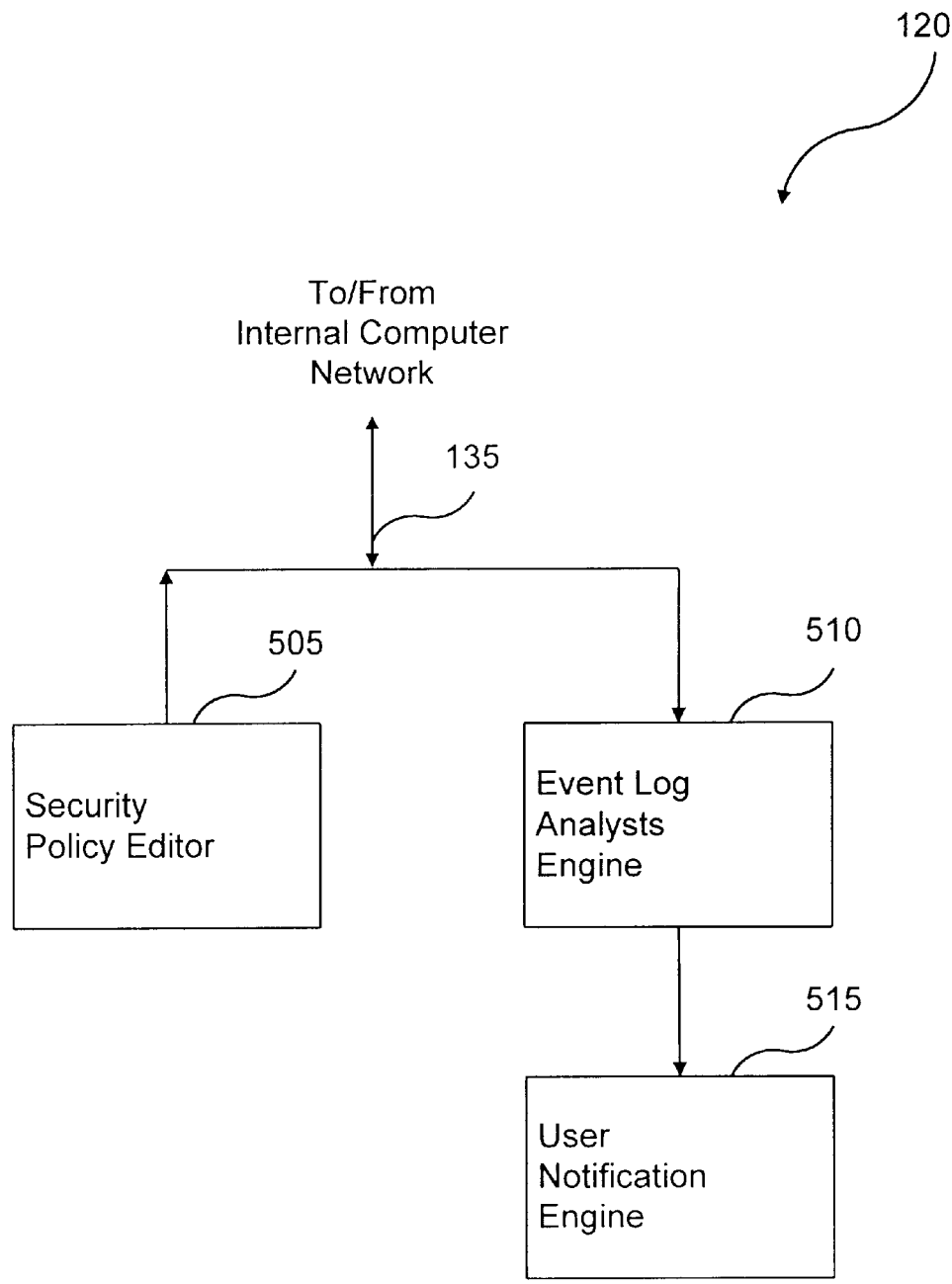
FIG. 5 is a block diagram illustrating details of the security management console of FIG. 1.

FIG. 5 is a block diagram illustrating details of the security management console 120, which includes a security policy editor 505 coupled to the communications channel 135, an event log analysis engine 510 coupled between communications channel 135 and a user notification engine 515, and a Downloadable database review engine 520 coupled to the communications channel 135. The security management console 120 further includes computer components similar to the computer components illustrated in FIG. 2.

The security policy editor 505 uses an I/O interface similar to I/O interface 215 for enabling authorized user modification of the security policies 305. That is, the security policy editor 505 enables the authorized user to modify specific security policies 305 corresponding to the users 260, the default or generic security policy 305, the Downloadables to block per administrative override, the Downloadables to allow per administrative override, the trusted certificate lists 415, the policy selectors 405, the access control lists 410, the URLs in the URL rule bases 420, etc. For example, if the authorized user learns of a new hostile Downloadable, then the user can add the Downloadable to the Downloadables to block per system override.

The event log analysis engine 510 examines the status reports contained in the event log 245 stored in the data storage device 230. The event log analysis engine 510 determines whether notification of the user (e.g., the security system manager or MIS director) is warranted. For example, the event log analysis engine 510 may warrant user notification whenever ten (10) suspicious Downloadables have been discarded by internal network security system 110 within a thirty (30) minute period, thereby flagging a potential imminent security threat. Accordingly, the event log analysis engine 510 instructs the user notification engine 515 to inform the user. The user notification engine 515 may send an e-mail via internal communications interface 220 or via external communications interface 210 to the user, or may display a message on the user's display device (not shown).

Figure 6A:
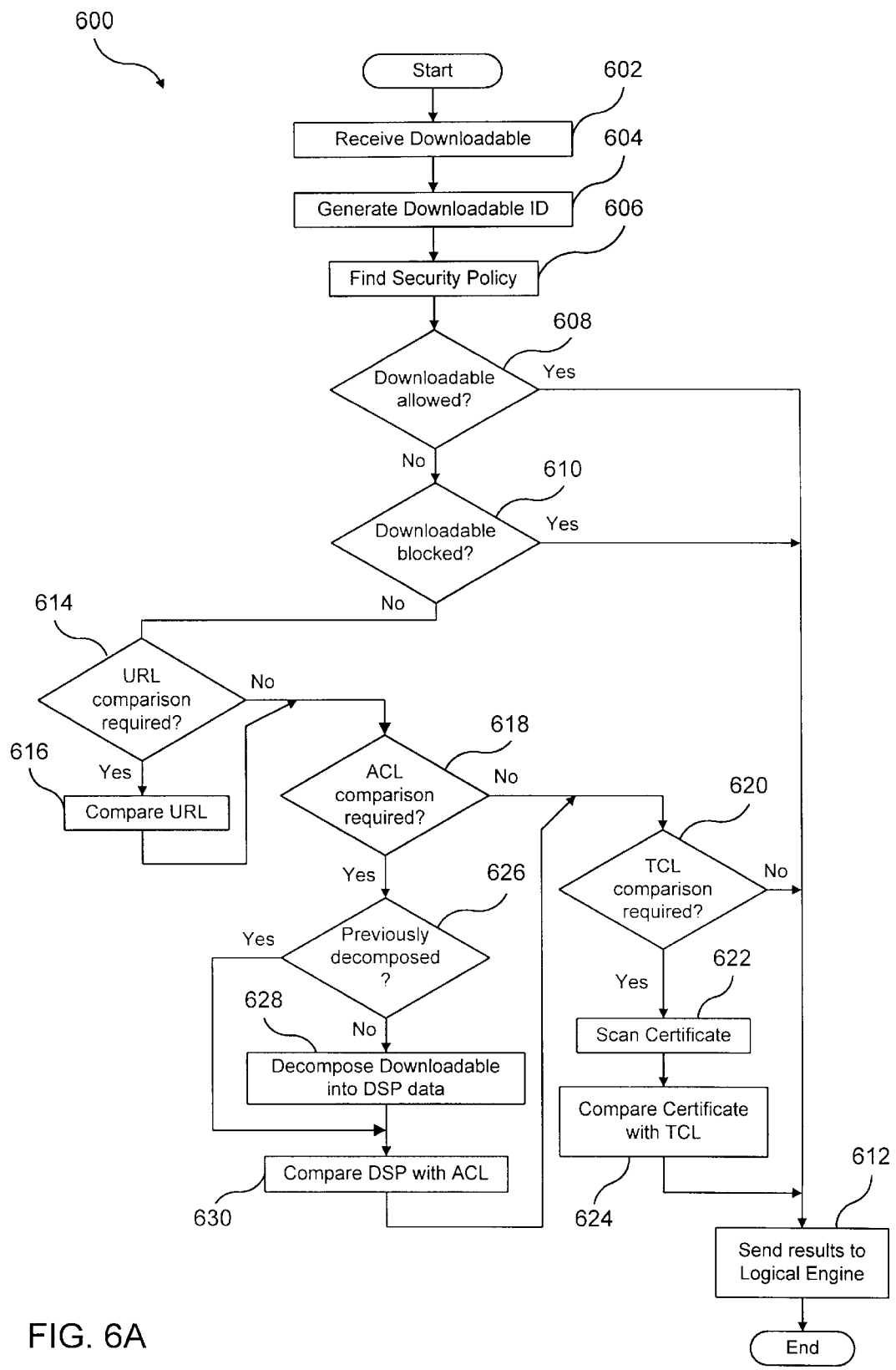
FIG. 6A is a flowchart illustrating a method of examining for suspicious Downloadables, in accordance with the present invention.

FIG. 6A is a flowchart illustrating a method 600 for protecting an internal computer network 115 from suspicious Downloadables. Method 600 begins with the ID generator 315 in step 602 receiving a Downloadable. The ID generator 315 in step 604 generates a Downloadable ID identifying the received Downloadable, preferably, by generating a digital hash of the Downloadable code (including prefetched components). The policy finder 317 in step 606 finds the appropriate security policy 305 corresponding to the userID specifying intended recipient (or the group to which the intended recipient belongs) and the Downloadable. The selected security policy 305 may be the default security policy 305. Step 606 is described in greater detail below with reference to FIG. 6B.

The first comparator 320 in step 608 examines the lists of Downloadables to allow or to block per administrative override 425 against the Downloadable ID of the incoming Downloadable to determine whether to allow the Downloadable automatically. If so, then in step 612 the first comparator 320 sends the results to the logical engine 333. If not, then the method 600 proceeds to step 610. In step 610, the first comparator 620 examines the lists of Downloadables to block per administrative override 425 against the Downloadable ID of the incoming Downloadable for determining whether to block the Downloadable automatically. If so, then the first comparator 420 in step 612 sends the results to the logical engine 333. Otherwise, method 600 proceeds to step 614.

In step 614, the first comparator 320 determines whether the security policy 305 indicates that the Downloadable should be tested according to Path 4. If not, then method 600 jumps to step 618. If so, then the URL comparator 350 in step 616 compares the URL embodied in the incoming Downloadable against the URLs of the URL rules bases 420, and then method 600 proceeds to step 618.

In step 618, the first comparator 320 determines whether the security policy 305 indicates that the Downloadable should be tested according to Path 2. If not, then method 600 jumps to step 620. Otherwise, the code scanner 235 in step 626 examines the DSP data 310 based on the Downloadable ID of the incoming Downloadable to determine whether the Downloadable has been previously decomposed. If so, then method 600 jumps to step 630. Otherwise, the code scanner 325 in step 628 decomposes the Downloadable into DSP data. Downloadable decomposition is described in greater detail with reference to FIG. 7. In step 630, the ACL comparator 330 compares the DSP data of the incoming Downloadable against the access control lists 410 (which include the criteria necessary for the Downloadable to fail or pass the test).

In step 620, the first comparator 320 determines whether the security policy 305 indicates that the Downloadable should be tested according to Path 3. If not, then method 600 returns to step 612 to send the results of each of the test performed to the logical engine 333. Otherwise, the certificate scanner 622 in step 622 scans the Downloadable for an embodied certificate. The certificate comparator 345 in step 624 retrieves trusted certificates from the trusted certificate lists (TCL) 415 and compares the embodied certificate with the trusted certificates to determine whether the Downloadable has been signed by a trusted source. Method 600 then proceeds to step 612 by the certificate scanner 345 sending the results of each of the paths taken to the logical engine 333. The operations of the logical engine 333 are described in greater detail below with reference to FIG. 6C. Method 600 then ends.

One skilled in the art will recognize that the tests may be performed in a different order, and that each of the tests need not be performed. Further, one skilled in the art will recognize that, although path 1 is described in FIG. 6A as an automatic allowance or blocking, the results of Path 1 may be another predicate to be applied by the logical engine 333. Further, although the tests are shown serially in FIG. 6A, the tests may be performed in parallel as illustrated in FIG. 3.

Figure 6B:
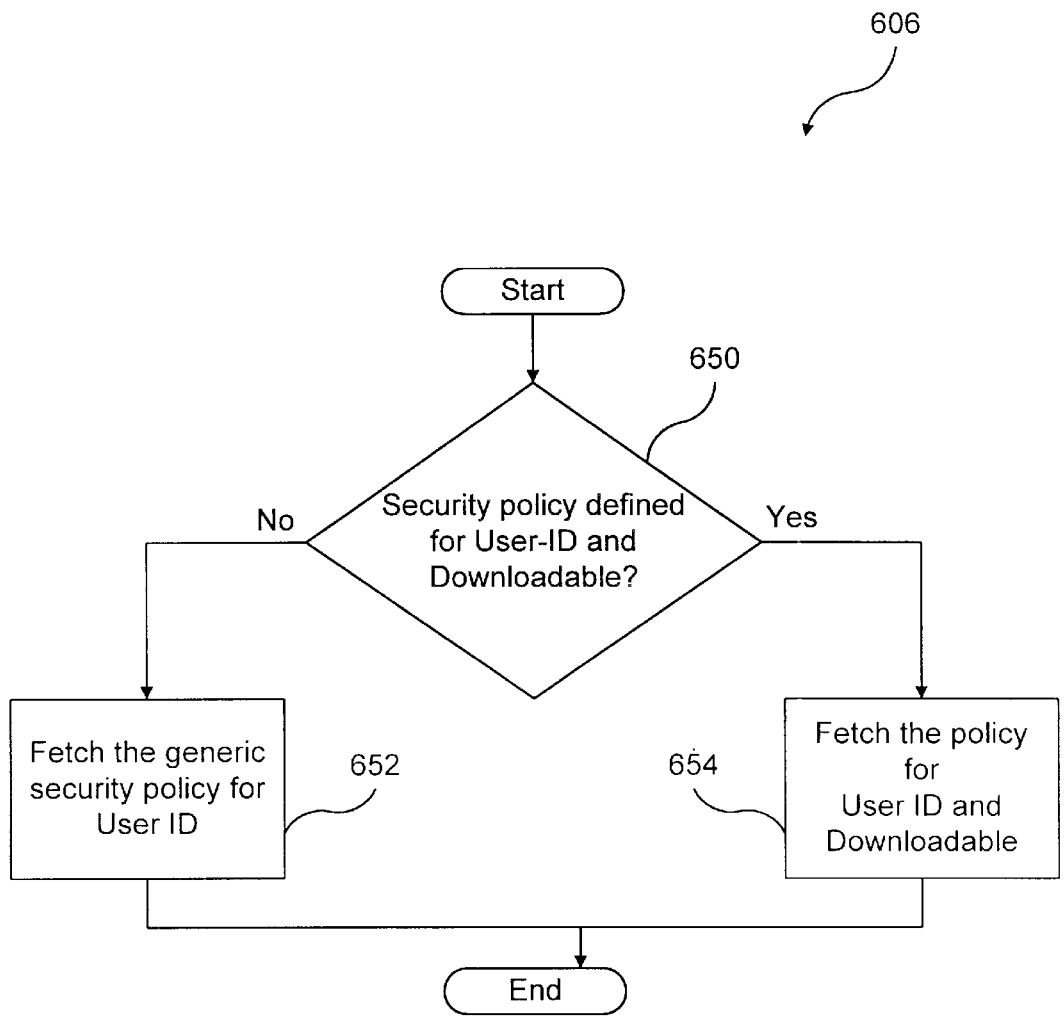
FIG. 6B is a flowchart illustrating details of the step for finding the appropriate security policy of FIG. 6A.

FIG. 6B is a flowchart illustrating details of step 606 of FIG. 6A (referred to herein as method 606). Method 606 begins with the policy finder 317 in step 650 determining whether security policies 305 include a specific security policy corresponding to the userID and the Downloadable. If so, then the policy finder 317 in step 654 fetches the corresponding specific policy 305. If not, then the policy finder 317 in step 652 fetches the default or generic security policy 305 corresponding to the userID. Method 606 then ends.

Figure 6C:
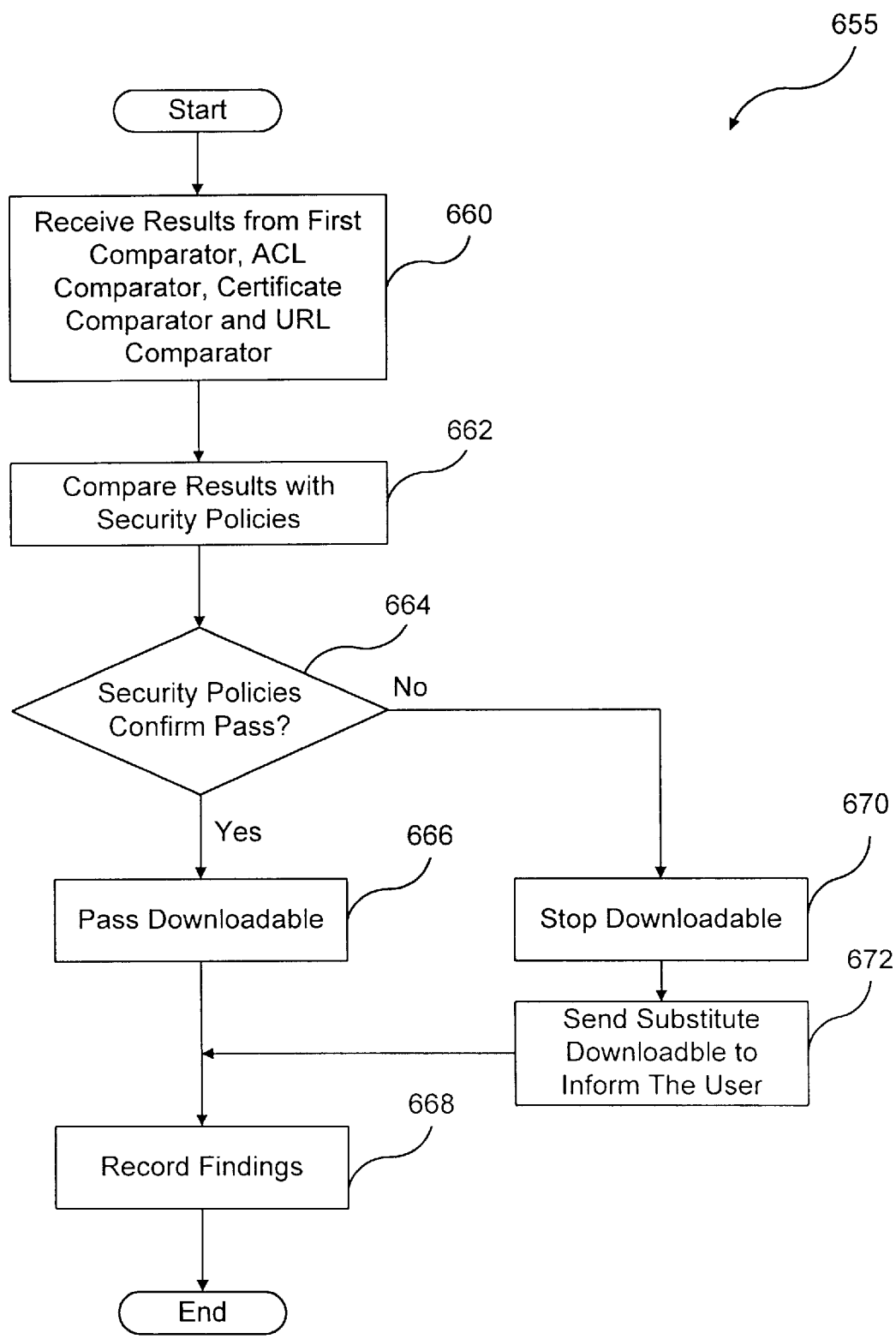
FIG. 6C is a flowchart illustrating a method for determining whether an incoming Downloadable is to be deemed suspicious.

FIG. 6C is a flowchart illustrating details of a method 655 for determining whether to allow or to block the incoming Downloadable. Method 655 begins with the logical engine 333 in step 660 receiving the results from the first comparator 320, from the ACL comparator 330, from the certificate comparator 345 and from the URL comparator 350. The logical engine 333 in step 662 compares the results with the policy selector 405 embodied in the security policy 305, and in step 664 determines whether the policy selector 405 confirms the pass. For example, the policy selector 405 may indicate that the logical engine 333 pass the Downloadable if it passes one of the tests of Path 1, Path 2, Path 3 and Path 4. If the policy selector 405 indicates that the Downloadable should pass, then the logical engine 333 in step 666 passes the Downloadable to the intended recipient. In step 668, the logical engine 333 sends the results to the record-keeping engine 335, which in turn stores the results in the event log 245 for future review. Method 655 then ends. Otherwise, if the policy selector 405 in step 664 indicates that the Downloadable should not pass, then the logical engine 333 in step 670 stops the Downloadable and in step 672 sends a non-hostile substitute Downloadable to inform the user that the incoming Downloadable has been blocked. Method 655 then jumps to step 668.

Figure 7:
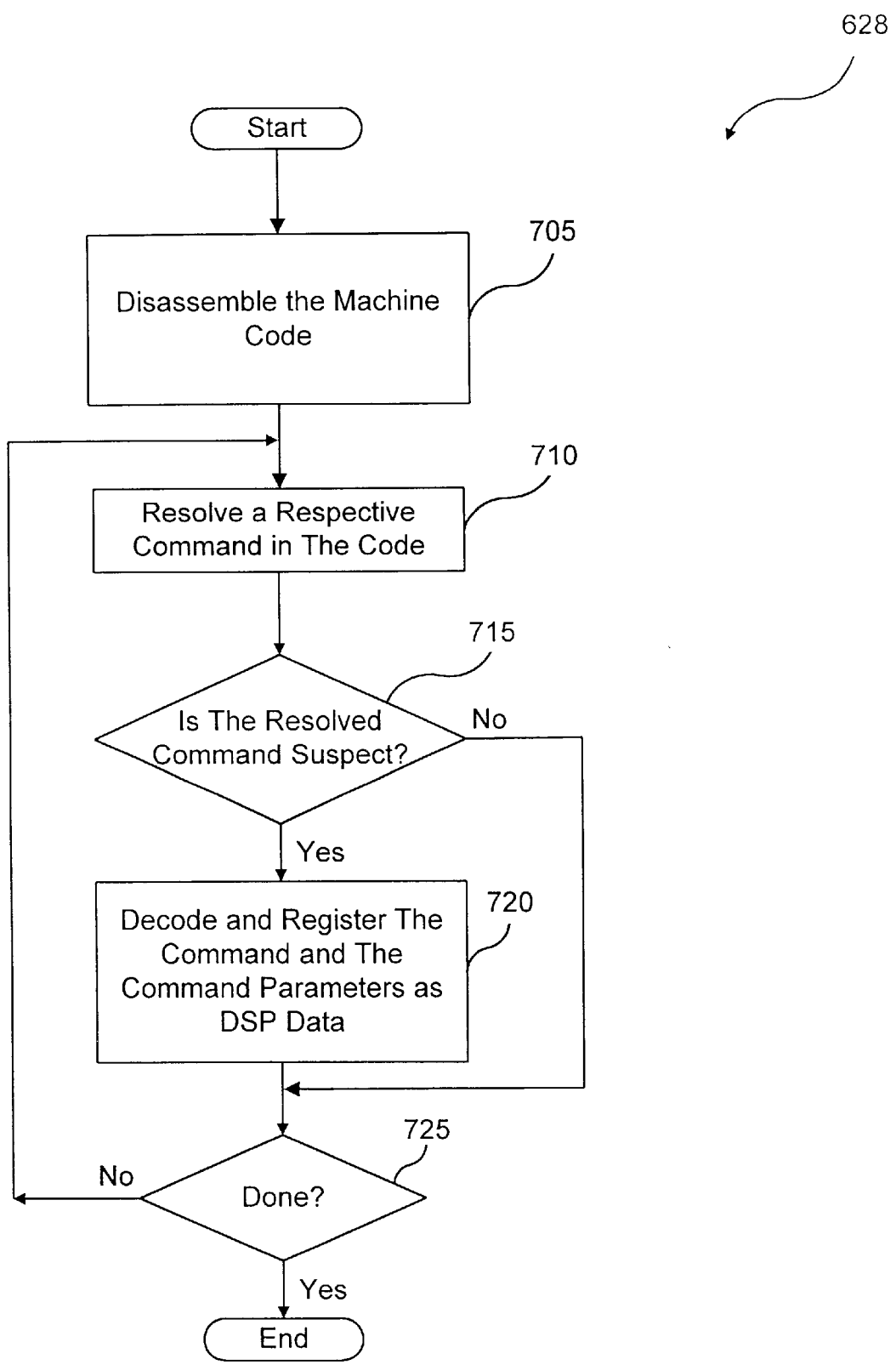
FIG. 7 is a flowchart illustrating details of the FIG. 6 step of decomposing a Downloadable.

FIG. 7 is a flowchart illustrating details of step 628 of FIG. 6A (referred to herein as method 628) for decomposing a Downloadable into DSP data 310. Method 628 begins in step 705 with the code scanner 325 disassembling the machine code of the Downloadable. The code scanner 325 in step 710 resolves a respective command in the machine code, and in step 715 determines whether the resolved command is suspicious (e.g., whether the command is one of the operations identified in the list described above with reference to FIG. 3). If not, then the code scanner 325 in step 725 determines whether it has completed decomposition of the Downloadable, i.e., whether all operations in the Downloadable code have been resolved. If so, then method 628 ends. Otherwise, method 628 returns to step 710.

Otherwise, if the code scanner 325 in step 715 determines that the resolved command is suspect, then the code scanner 325 in step 720 decodes and registers the suspicious command and its command parameters as DSP data 310. The code scanner 325 in step 720 registers the commands and command parameters into a format based on command class (e.g., file operations, network operations, registry operations, operating system operations, resource usage thresholds). Method 628 then jumps to step 725.

Figure 8:
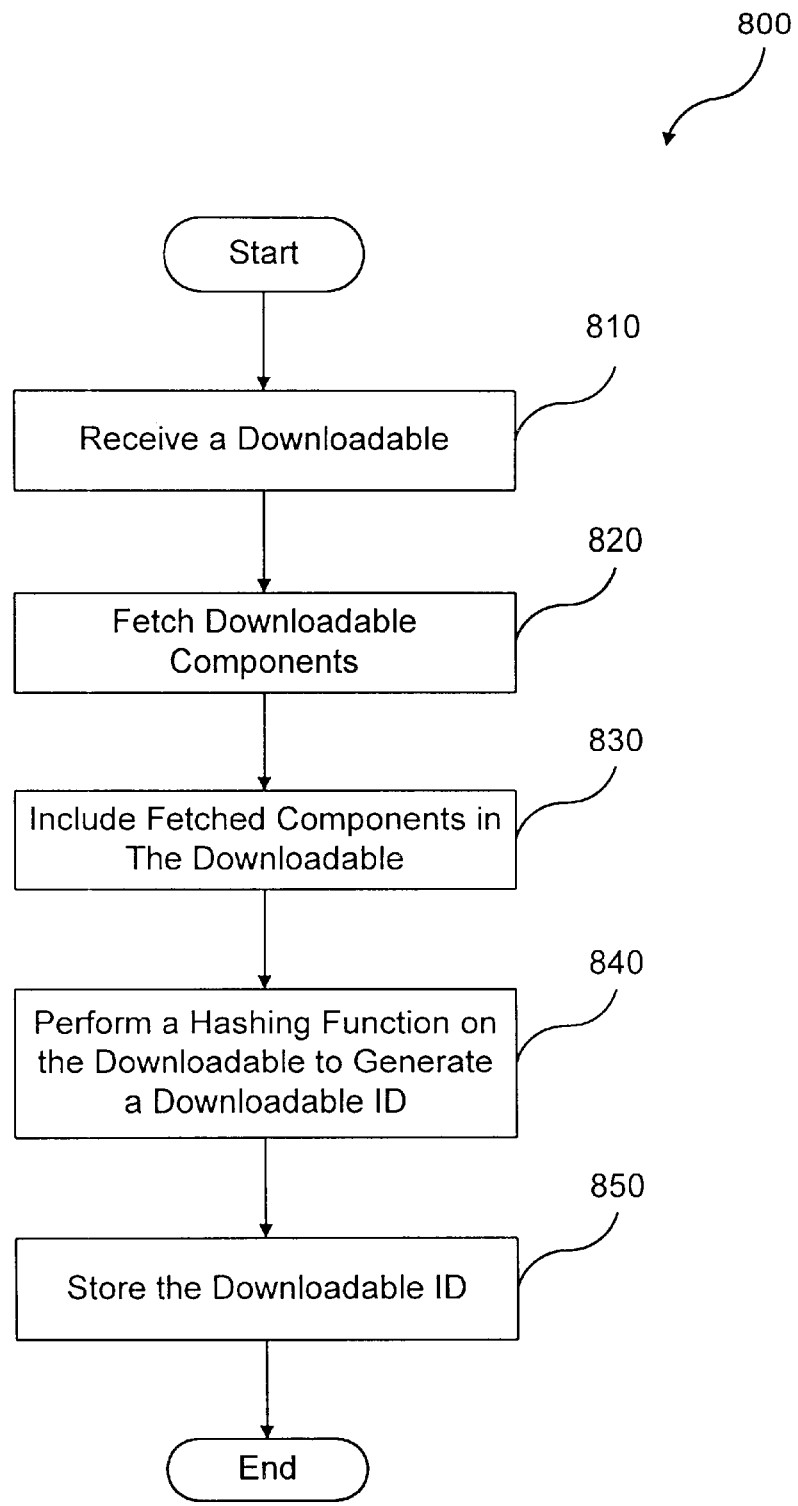
FIG. 8 is a flowchart illustrating a method 800 for generating a Downloadable ID for identifying a Downloadable.

FIG. 8 is a flowchart illustrating a method 800 for generating a Downloadable ID for identifying a Downloadable. Method 800 begins with the ID generator 315 in step 810 receiving a Downloadable from the external computer network 105. The ID generator 315 in step 820 may fetch some or all components referenced in the Downloadable code, and in step 830 includes the fetched components in the Downloadable code. The ID generator 315 in step 840 performs a hashing function on at least a portion of the Downloadable code to generate a Downloadable ID. The ID generator 315 in step 850 stores the generated Downloadable ID in the security database 240 as a reference to the DSP data 310. Accordingly, the Downloadable ID will be the same for the identical Downloadable each time it is encountered.

The foregoing description of the preferred embodiments of the invention is by way of example only, and other variations of the above-described embodiments and methods are provided by the present invention. For example, although the invention has been described in a system for protecting an internal computer network, the invention can be embodied in a system for protecting an individual computer. Components of this invention may be implemented using a programmed general purpose digital computer, using application specific integrated circuits, or using a network of interconnected conventional components and circuits. The embodiments described herein have been presented for purposes of illustration and are not intended to be exhaustive or limiting. Many variations and modifications are possible in light of the foregoing teaching. The system is limited only by the following claims.

What is claimed is:

1. A computer-based method, comprising the steps of:
   receiving an incoming Downloadable addressed to a client, by a server that serves as a gateway to the client;
   comparing, by the server, Downloadable security profile data pertaining to the Downloadable, the Downloadable security profile data includes a list a suspicious computer operations that may be attempted by the Downloadable, against a security policy to determine if the security policy has been violated; and
   preventing execution of the Downloadable by the client if the security policy has been violated.

2. The method of claim 1, further comprising the step of decomposing the Downloadable into the Downloadable security profile data.

3. The method of claim 2, wherein the security policy includes an access control list and further comprising the step of comparing the Downloadable security profile data against the access control list.

4. The method of claim 1, further comprising the steps of scanning for a certificate and comparing the certificate against a trusted certificate.

5. The method of claim 1, further comprising the step of comparing the URL from which the Downloadable originated against a known URL.

6. The method of claim 5, wherein the known URL is a trusted URL.

7. The method of claim 5, wherein the known URL is an untrusted URL.

8. The method of claim 1, wherein the Downloadable includes a Java™ applet.

9. The method of claim 1, wherein the Downloadable includes an ActiveX™ control.

10. The method of claim 1, wherein the Downloadable includes a JavaScript™ script.

11. The method of claim 1, wherein the Downloadable includes a Visual Basic script.

12. The method of claim 1, wherein
    the security policy includes a default security policy to be applied regardless of the client to whom the Downloadable is addressed.

13. The method of claim 1, wherein
    the security policy includes a specific security policy corresponding to the client to whom the Downloadable is addressed.

14. The method of claim 1, wherein
    the client belongs to a particular group; and
    the security policy includes a specific security policy corresponding to the particular group.

15. The method of claim 1, further comprising, after preventing execution of the Downloadable, the step of sending a substitute non-hostile Downloadable to the client for informing the client.

16. The method of claim 1, further comprising, after preventing execution of the Downloadable, the step of recording the violation in an event log.

17. The method of claim 1, further comprising the step of computing a Downloadable ID to identify the Downloadable.

18. The method of claim 16, further comprising the steps of fetching components identified by the Downloadable and including the fetched components in the Downloadable.

19. The method of claim 18, further comprising the step of performing a hashing function on the Downloadable to compute a Downloadable ID to identify the Downloadable.

20. The method of claim 18, further comprising the step of fetching all components identified by the Downloadable.

21. The method of claim 1 further comprising the step of examining the intended recipient userID to determine the appropriate security policy.

22. The method of claim 20, wherein the appropriate security policy includes a default security policy.

23. The method of claim 1, further comprising the step of examining the Downloadable to determine the appropriate security policy.

24. The method of claim 1, further comprising the step of comparing the Downloadable against a known Downloadable.

25. The method of claim 24, wherein the known Downloadable is hostile.

26. The method of claim 24, wherein the known Downloadable is non-hostile.

27. The method of claim 24, further comprising the step of including a previously received Downloadable as a known Downloadable.

28. The method of claim 27, wherein the security policy identifies a Downloadable to be blocked per administrative override.

29. The method of claim 28, wherein the security policy identifies a Downloadable to be allowed per administrative override.

30. The method of claim 1, further comprising the step of informing a user upon detection of a security policy violation.

31. The method of claim 1, further comprising the steps of recognizing the incoming Downloadable, and obtaining the Downloadable security profile data for the incoming Downloadable from memory.

32. A system for execution by a server that serves as a gateway to a client, the system comprising:
a security policy;
an interface for receiving an incoming Downloadable addressed to a client;
a comparator, coupled to the interface, for comparing Downloadable security profile data pertaining to the Downloadable, the Downloadable security profile data includes a list a suspicious computer operations that may be attempted by the Downloadable, against the security policy to determine if the security policy has been violated; and
a logical engine for preventing execution of the Downloadable by the client if the security policy has been violated.

33. The system of claim 32, wherein the Downloadable includes a Java™ applet.

34. The system of claim 32, wherein the Downloadable includes ActiveX™ control.

35. The system of claim 32, wherein the Downloadable includes a JavaScript™ script.

36. The system of claim 32, wherein the Downloadable includes a Visual Basic script.

37. The system of claim 32, wherein
the security policy includes a default security policy to be applied regardless of the client to whom the Downloadable is addressed.

38. The system of claim 32, wherein
the security policy includes a specific security policy corresponding to the client to whom the Downloadable is addressed.

39. The system of claim 32, wherein
the client belongs to a particular group; and
the security policy includes a specific security policy corresponding to the particular group.

40. The system of claim 32, further comprising an ID generator coupled to the interface for computing a Downloadable ID identifying the Downloadable.

41. The system of claim 40, wherein the ID generator prefetches all components of the Downloadable and uses all components to compute the Downloadable ID.

42. The system of claim 41, wherein the ID generator computes the digital hash of all the prefetched components.

43. The system of claim 32, further comprising a policy finder for finding the security policy.

44. The system of claim 43, wherein the policy finder finds the security policy based on the user.

45. The system of claim 43 wherein the policy finder finds the security policy based on the user and the Downloadable.

46. The system of claim 43, wherein the policy finder obtains the default security policy.

47. The system of claim 32 wherein the comparator examines the security policy to determine which tests to apply.

48. The system of claim 47 wherein the comparator compares the Downloadable against a known Downloadable.

49. The system of claim 48, wherein the known Downloadable is hostile.

50. The system of claim 48, wherein the known Downloadable is non-hostile.

51. The system of claim 32, wherein the security policy identifies a Downloadable to be blocked per administrative override.

52. The system of claim 32, wherein the security policy identifies a Downloadable to be allowed per administrative override.

53. The system of claim 32, wherein
the comparator sends a substitute non-hostile Downloadable to the client for informing the client.

54. The system of claim 32, further comprising a code scanner coupled to the comparator for decomposing the Downloadable into the Downloadable security profile data.

55. The system of claim 54, further comprising an ACL comparator coupled to the code scanner for comparing the Downloadable security profile data against an access control list.

56. The system of claim 32, further comprising a certificate scanner coupled to the comparator for examining the Downloadable for a certificate.

57. The system of claim 56, further comprising a certificate comparator coupled to the certificate scanner for comparing the certificate against a trusted certificate.

58. The system of claim 32, further comprising a URL comparator coupled to the comparator for comparing the URL from which the Downloadable originated against a known URL.

59. The system of claim 58, wherein the known URL identifies an untrusted URL.

60. The system of claim 58, wherein the known URL identifies a trusted URL.

61. The system of claim 31, wherein the logical engine responds according to the security policy.

62. The system of claim 31, further comprising a record-keeping engine coupled to the comparator for recording results in an event log.

63. The system of claim 32, further comprising memory storing the Downloadable security profile data for the incoming Downloadable.

64. A system for execution on a server that serves as a gateway to a client, comprising:

means for receiving an incoming Downloadable addressed to a client;

means for comparing Downloadable security profile data pertaining to the Downloadable, the Downloadable security profile data includes a list a suspicious computer operations that may be attempted by the Downloadable, against a security policy to determine if the security policy has been violated; and means for preventing execution of the Downloadable by the client if the security policy has been violated.

65. A computer-readable storage medium storing program code for causing a server that serves as a gateway to a client to perform the steps of:

receiving an incoming Downloadable addressed to a client;

comparing Downloadable security profile data pertaining to the Downloadable against a security policy to determine if the security policy has been violated; and preventing execution of the Downloadable by the client if the security policy has been violated.

66. A method, comprising:

receiving a Downloadable;

decomposing the Downloadable into Downloadable security profile data; the Downloadable security profile data includes a list a suspicious computer operations that may be attempted by the Downloadable, comparing the Downloadable security profile data against a security policy; and preventing execution of the Downloadable if the Downloadable security profile data violates the security policy.

67. The method of claim 66, further comprising:

fetching all components referenced by the Downloadable;

performing a hashing function of the Downloadable and the components fetched to compute a Downloadable ID; and storing the Downloadable security profile data and the Downloadable ID in memory.

68. A method, comprising:

providing memory storing known-Downloadable security profile data and a that includes a list a suspicious computer operations that may be attempted by a Downloadable known-Downloadable ID corresponding to the Downloadable security profile data;

receiving an incoming Downloadable;

fetching all components referenced by the incoming Downloadable;

performing a hashing function of the Downloadable and the components to compute an incoming-Downloadable ID;

comparing the known-Downloadable ID against the incoming-Downloadable ID;

retrieving the Downloadable security profile data if the known-Downloadable ID and the incoming-Downloadable ID match; and comparing the Downloadable security profile data against a security policy to determine if the incoming Downloadable violates the security policy.

* * * * *

UNITED STATES PATENT AND TRADEMARK OFFICE
CERTIFICATE OF CORRECTION

PATENT NO. : 6,092,194
DATED : July 18, 2000
INVENTOR(S) : Shlomo Touboul

Page 1 of 1

It is certified that error appears in the above-identified patent and that said Letters Patent is hereby corrected as shown below:

Column 13,
Line 19, after "to the Downloadable" and before "against a security" insert --, the Downloadable security profile data includes a list a suspicious computer operations that may be attempted by the Downloadable, --

Column 14,
Line 12, after "profile data and" and before "that includes" delete -- a --

Signed and Sealed this

Fifth Day of February, 2002

Attest:

Attesting Officer

JAMES E. ROGAN
Director of the United States Patent and Trademark Office

(12) EX PARTE REEXAMINATION CERTIFICATE (7004th)
United States Patent
Touboul

(10) Number: US 6,092,194 C1
(45) Certificate Issued: Aug. 18, 2009

(54) SYSTEM AND METHOD FOR PROTECTING A COMPUTER AND NETWORK FROM HOSTILE DOWNLOADABLES

(75) Inventor: Shlomo Touboul, Kefar-Haim (IL)

(73) Assignee: Finjan Software, Ltd., Netanya (IL)

Reexamination Request:
No. 90/009,175, Jun. 6, 2008

Reexamination Certificate for:
Patent No.: 6,092,194
Issued: Jul. 18, 2000
Appl. No.: 08/964,388
Filed: Nov. 6, 1997

Certificate of Correction issued Feb. 5, 2002.

Related U.S. Application Data

(60) Provisional application No. 60/030,639, filed on Nov. 8, 1996.

(51) Int. Cl.
G06F 1/00 (2006.01)
G06F 21/00 (2006.01)

(52) U.S. Cl. ........................................ 726/24
(58) Field of Classification Search ............... None
See application file for complete search history.

(56) References Cited

U.S. PATENT DOCUMENTS

| | | | |
|---|---|---|---|
| 5,359,659 A | 10/1994 | Rosenthal | 726/24 |
| 5,398,196 A | 3/1995 | Chambers | |
| 5,412,717 A | 5/1995 | Fischer | 713/156 |
| 5,414,833 A | 5/1995 | Hershey et al. | 395/575 |
| 5,692,047 A | 11/1997 | McManis | |
| 5,740,441 A | 4/1998 | Yellin et al. | 395/704 |
| 5,825,877 A | 10/1998 | Dan | |
| 5,859,966 A | 1/1999 | Hayman et al. | 726/23 |
| 5,864,683 A | 1/1999 | Boebert et al. | |
| 5,951,698 A | 9/1999 | Chen et al. | 714/38 |
| 5,956,481 A | 9/1999 | Walsh et al. | 726/23 |
| 5,974,549 A | 10/1999 | Golan | 726/23 |
| 5,983,348 A | 11/1999 | Ji | 726/13 |
| 6,263,442 B1 | 7/2001 | Mueller et al. | 713/201 |
| 6,571,338 B1 | 5/2003 | Shaio et al. | 713/201 |

FOREIGN PATENT DOCUMENTS

JP 08-263447 10/1996

OTHER PUBLICATIONS

"WWW Proxy to cut off Java," message from Carl Claunch dated Apr. 12, 1996 available at http://groups.google.com/group/muc.lists.firewalls/msg/38bb246b7eb3bec3.

(Continued)

Primary Examiner—Christopher E Lee

(57) ABSTRACT

A system protects a computer from suspicious Downloadables. The system comprises a security policy, an interface for receiving a Downloadable, and a comparator, coupled to the interface, for applying the security policy to the Downloadable to determine if the security policy has been violated. The Downloadable may include a Java™ applet, an ActiveX™ control, a JavaScript™ script, or a Visual Basic script. The security policy may include a default security policy to be applied regardless of the client to whom the Downloadable is addressed, or a specific security policy to be applied based on the client or the group to which the client belongs. The system uses an ID generator to compute a Downloadable ID identifying the Downloadable, preferably, by fetching all components of the Downloadable and performing a hashing function on the Downloadable including the fetched components. Further, the security policy may indicate several tests to perform, including (1) a comparison with known hostile and non-hostile Downloadables; (2) a comparison with Downloadables to be blocked or allowed per administrative override; (3) a comparison of the Downloadable security profile data against access control lists; (4) a comparison of a certificate embodied in the Downloadable against trusted certificates; and (5) a comparison of the URL from which the Downloadable originated against trusted and untrusted URLs. Based on these tests, a logical engine can determine whether to allow or block the Downloadable.

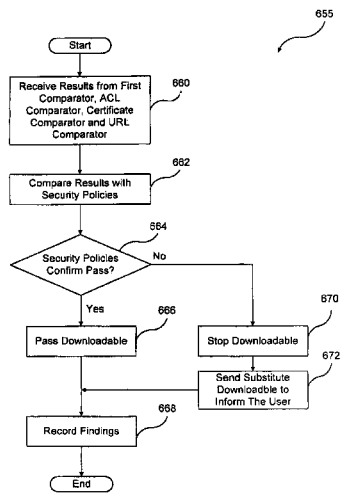

OTHER PUBLICATIONS

"Improved JavaScript and Java screening function," message from Carl Claunch dated May 4, 1996, available at http://groups.google.com/group/muc.lists.firewalls/msg/96bc8043476ab0b7.

"New version of Java, JavaScript, ActiveX screening http–gw patch," message from Carl Claunch dated Jul. 3, 1996 available at http://groups.google.com/group/muc.lists.firewalls/msg/41a45c2a9d5373f2.

"Java Blocking," message from Carl Claunch dated Sep. 25, 1996 available at http://groups.google.com/group/muc.lists.firewalls/msg/2a5ec02e00a37071.

F. M. Avolio and M. J. Ranum, "A Toolkit and Methods for Internet Firewalls," In Technical Summer Conference, pp. 37–44, Boston, Massachusetts, Jun. 1994, USENIX. available at http://citeseer.ist.psu.edu.ranum94toolkit.html.

M. M. King, "Identifying and Controlling Undesirable Program Behaviors," Proceedings of the 14th National Computer Security Conference, 1991.

D. Wichers, D. Cook, R. Olsson, J. Crossley, P. Kerchen, K. Levitt, and R. Lo. "PACL's: an access control list approach to anti–viral security". In USENIX Workshop Proceedings. UNIX Security II, pp. 71–82, 1990.

Janet Endrijonas, "Rx PC, the Anti–Virus Handbook," 1–9 (McGraw Hill 1993).

International Search Report for Application No. PCT/IB97/01626, dated May 14, 2999, 2 pp.

Zhang, X. N., "Secure Code Distribution," *Computer*, vol. 30, pp. 76–79, Jun. 1997.

"IBM AntiVirus User's Guide Version 2.4," International Business Machines Corporation, pp. 6–7, Nov. 15, 1995.

Supplementary European Search Report for Application No. EP 97 95 0351, dated Nov. 17, 2004, 2 pp.

"Part 2: Java Vs. VBS—Breadth of Runtime Environments and Security Make Java a Good Choice for the Internet," Nikkei Electronics, pp. 212–221, No. 658, Mar. 25, 1996.

Lemay, Laura, et al., "Approach of Java Language, Applet, AWT and Advanced Apparatus," First Edition, 22 pp. (translated), Aug. 20, 1996 (CS–NB–1999–00238–001).

Veldman, Franz, "Combating Viruses Heuristically," *Virus Bulletin Conference* 67–76, Sep. 1993.

Lo, Raymond W., et al., "Towards a Testbed for Malicious Code Detection," *Compcon Spring '91 Digest of Papers* at 160–166 (IEEE), 1991.

Lo, Raymond W., et al., "MCF: A Malicious Code Filter," 27 pp., May 4, 1994.

Polk, W. Timothy et al., "Anti–Virus Tools and Techniques for Computer Systems," Noyes Data Corporation, Park Ridge, New Jersey, pp. 12–27, Copyright 1995 (with cover and copyright pages—18 pp.).

Rasmusson, Andreas, et al., "Personal Security Assistance for Secure Internet Commerce (Position Paper)," 12 pp., Available as dvi, ps, html, at http://www.sics.se/~ara/papers/NSP96.html, Sep. 16, 1996.

Le Charlier, Baudouin, et al., "Dynamic Detection and Classification of Computer Viruses Using General Behaviour Patterns," 22 pp., Jul. 2, 1995.

Lo, Raymond W., et al., "Towards a Testbed for Malicious Code Detection," from the Lawrence Livermore National Laboratory, 9 pp., Feb. 25—Mar. 1, 1991.

Martin, Jr., David M., "Blocking Java Applets at the Firewall," 11 pp., Available at http://www.cs.bu.edu/techreports/pdf/1996–026–java–firewalls.pdf (1997).

Skardhamar, Rune, "Virus: Detection and Elimination," Academic Press, Inc., pp. 33–48, Copyright 1996 (with cover and copyright page—18 pp.).

Hruska, Jan, "Computer Viruses and Anti–Virus Warfare (Second Revised Edition)," Ellis Horwood, pp. 87–95, Copyright 1992 (with cover and copyright page—11 pp.).

IS Tutorial Group 10–11, "Active Content Security," 35 pp., Dec. 13, 1999.

Stang, David J., "Computer Viruses and Artificial Intelligence," *Virus Bulletin Conference*, pp. 235–257, Sep. 1995.

Johannsen, Magnus, "Java Security and a Firewall Extension for Authenticity Control of Java Applets," Thesis Proposal, Computer Science Department, University of Colorado at Colorado Springs, 5 pp., Jan. 29, 1997.

Lo, Raymond, "Statis Analysis of Programs with Applications to Malicious Code Detection, Dissertation," 193 pp., 1992.

Marcionek, David, "A Complete ActiveX Web Control Tutorial," Available at http://www.codeproject.com/KB/COM/CompleteActiveX.aspx (2006).

Firewall Tookit (FWTK) 2.0 Beta Release, 1996.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–68 is confirmed.

* * * * *